United States Patent [19]  [11] 3,750,343
Johnson  [45] Aug. 7, 1973

[54] MACHINE TOOL
[75] Inventor: Donald R. Johnson, Worcester, Mass.
[73] Assignee: Cincinnati Milacron-Heald Corp. Worcester, Mass.
[22] Filed: Apr. 30, 1971
[21] Appl. No.: 138,936

[52] U.S. Cl. .............................. 51/50 R, 51/237 R
[51] Int. Cl. .............................................. B24b 5/00
[58] Field of Search ............ 51/48 R, 105 R, 237 R, 51/236 R, 50 R; 269/8

[56] References Cited
UNITED STATES PATENTS
2,787,874  4/1957  Blood ..................................... 51/236
2,741,481  4/1956  Ovtegren ................................. 269/8

Primary Examiner—Charles W. Lanham
Assistant Examiner—Robert M. Rogers
Attorney—Norman S. Blodgett

[57] ABSTRACT

A machine tool having a work driving means consisting of concentric conical shells associated with a coil for generating magnetic lines of flux.

4 Claims, 3 Drawing Figures

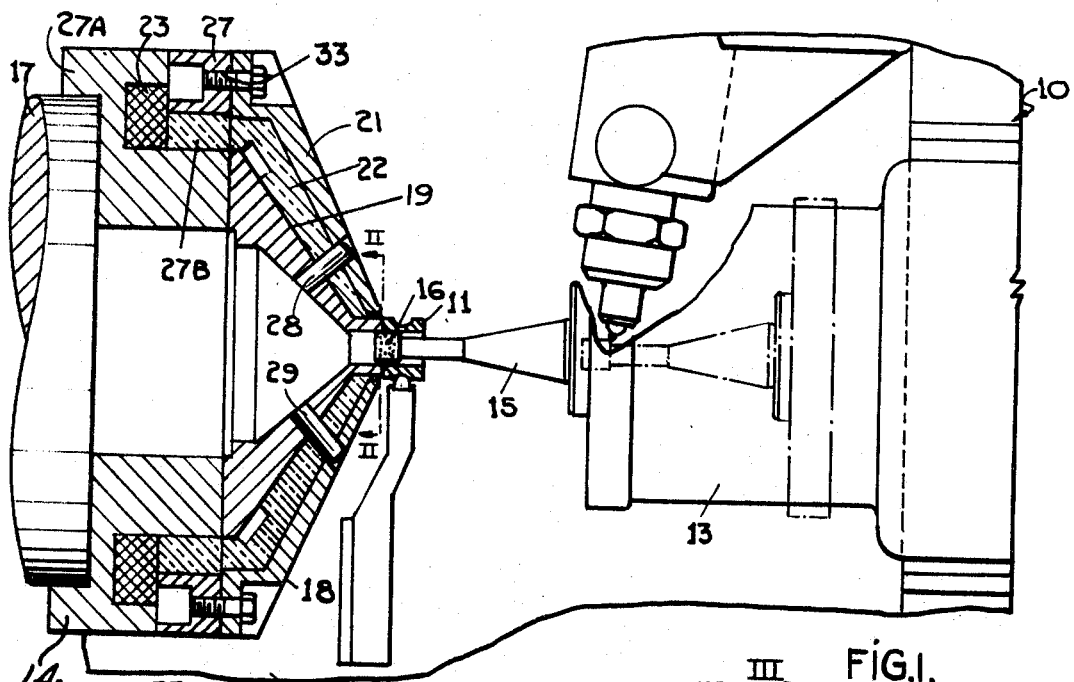
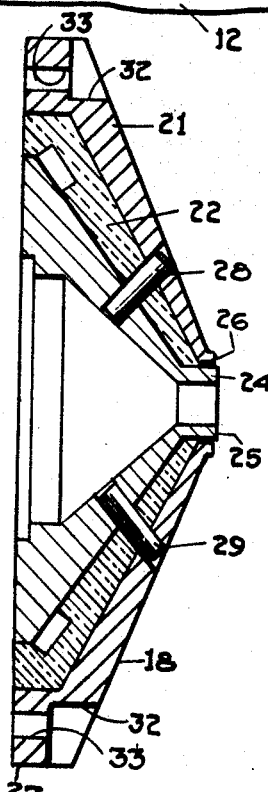
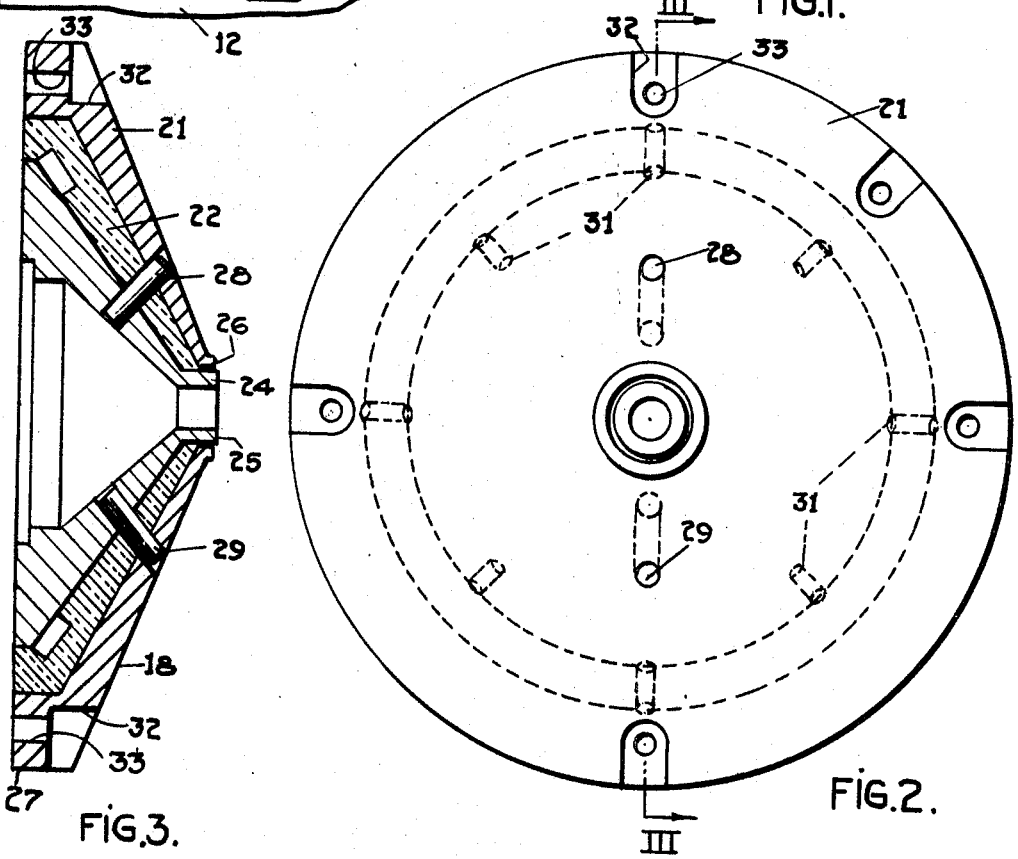
FIG.1.
FIG.3.
FIG.2.
INVENTOR
DONALD R JOHNSON
BY
Norman S. Blodgett
ATTORNEY

MACHINE TOOL

BACKGROUND OF THE INVENTION

In the operation of machine tools, there are many situations where it is necessary to rotate workpieces with a minimum of friction between the workpiece and the driving means. A particular situation where this exists is in the case of the internal grinding of ball bearing races. It is common practice to support the race by means of shoes contacting the outer cylindrical surface and to drive it by the use of a rotatable platen contacting the radial end surface. Particularly, in a situation where the ball bearing race is very thin, the end surface is small and, therefore, does not offer much surface for driving it by friction. Furthermore, it may be desirable not to allow any scratching of the end surface, as would be experienced with a friction drive. In such cases, it is desirable to use a so-called "magnetic" driver, such as the driver as shown and described in the patent of Yingst et al. U.S. Pat. No. 2,933,862 which issued on Apr. 26, 1960. In the case of the very thin walled workpiece, however, this type of driver may be undesirable because of the distortion of the shell against the supporting shoes. These and other difficulties experienced with the prior art devices have been obviated in a novel manner by the present invention.

It is, therefore, an outstanding object of the invention to provide a machine tool capable of driving thin walled workpieces with very little friction.

Another object of this invention is the provision of a machine tool including a magnetic driver for use in the internal grinding of a thin walled workpiece such as a ball bearing race.

A further object of the present invention is the provision of a machine tool having a magnetic driving means capable of exerting large magnetic forces despite the small area of contact with the workpiece.

With these and other objects in view, as will be apparent to those skilled in the art, the invention resides in the combination of parts set forth in the specification and covered by the claims appended hereto.

SUMMARY OF THE INVENTION

In general, the invention consists of a machine tool for generating a surface of revolution on a workpiece having a base, a toolhead mounted on the base, and a workhead mounted on the base and having a spindle rotating about the axis of the surface of revolution. A driver is mounted on the end of the spindle adjacent the toolhead, the driver consisting of a pair of spaced concentric frusto-conical shells of magnetic material separated by a body of non-magnetic material. An annular coil is mounted adjacent one of the shells to produce lines of force from one shell through the workpiece into the other shell.

More specifically, the inner shell is provided with a lip having a flat radial surface for contacting the workpiece and the other shell is provided with a similar flat radial surface which is spaced a small amount away from the first-mentioned flat surface and away from the workpiece.

BRIEF DESCRIPTION OF THE DRAWINGS

The character of the invention, however, may be best understood by reference to one of its structural forms, as illustrated by the accompanying drawings, in which:

FIG. 1 is a plan view with portions broken away of a machine tool incorporating the principles of the present invention, FIG. 2 is an enlarged view of the machine tool taken on the line II—II of FIG. 1, and FIG. 3 is a sectional view of the invention taken on the line III—III of FIG. 2.

DESCRIPTION OF THE PREFERRED EMBODIMENT

Referring first to FIG. 1, which best shows the general features of the invention, the machine tool, indicated generally by the reference numeral 10, is shown as being in the form of an internal grinding machine for generating a surface of revolution on a workpiece 11. For the purpose of illustration, the workpiece is shown as the inner race of a ball bearing having a fairly thin wall. The machine tool is provided with a base 12 on which are mounted a toolhead 13 and a workhead 14. The toolhead 13 is provided with a rotatable spindle 15 carrying on its outer end an abrasive wheel 16. The workhead 14 is provided with a rotatable spindle 17 mounted in the usual way for rotation in bearings and provided with a drive motor (not shown). The driver 18 is mounted on the end of the spindle adjacent the toolhead 13. The driver consists of a pair of spaced, concentric frusto-conical shells 19 and 21, which shells are separated by a body 22 of non-magnetic material. An annular coil 23 is mounted adjacent one of the shells to produce lines of force from one shell through the workpiece 11 into the other shell.

The inner shell 19 is provided with a lip 24 (see FIG. 2) having a flat radial surface 25 for contacting the workpiece. The outer shell 21 is provided with a similar flat radial surface 26 which is spaced a small amount away from the first-mentioned flat surface in the direction away from the toolhead 13. In the preferred embodiment, the spacing between the surfaces 25 and 26 may be in the order of 0.025 inches.

The coil 23 lies adjacent the inner shell 19 and a body of magnetic material consisting of an adapter including an iron ring 27 and an iron member 27A surround the end of the spindle 17. A body 27B of non-magnetic material lies between the ring 27 and the member 27A.

Each of the shells 19 and 21 consists of a body defined generally by an outer frusto-conical surface and an inner frusto-conical surface of substantially less angle than the outer surface. Furthermore, the outer surface of the inner shell is a frusto-conical surface of substantially smaller angle than that of the inner surface of the outer shell, so that the body 22 of non-magnetic material is thin at the small ends of the shells and substantially thicker at the large ends of the shells. Two pins 28 and 29 extend entirely through the shells 19 and 21 as well as the body 22 of non-magnetic material. Furthermore, suitable locking lugs 31 extend from the shells inwardly into the body 22 to lock the elements of the driver 18 together. The outer shell 21 is provided with recesses 32 and bores 33 to receive bolts for fastening them to the ring 27 of the adapter which, in turn, is fastened to the end of the spindle 17.

The operation of the invention will now be readily understood in view of the above description. Electrical power is brought into the coil 23 in the usual way by means of commutating devices (not shown). The magnetic lines of flux from the coil extend through the inner shell 19 down to its lip 24 where they are concentrated because of the thinner wall in that area and they merge from the surface 25 into the workpiece. They return through the thin air gap between the workpiece and the surface 26 of the outer shell 21 and pass through the shell 21 back to the ring 27. The ring 27 carries the lines of flux around into the spindle and back to the backside of the coil 23. In this way, despite a thin-walled workpiece, which would normally be difficult to use with a magnetic driver, sufficient lines of force are concentrated in the workpiece to bring about the desired holding effect. This is brought about by the fact that the cross-section of each of the inner and outer shells is reduced close to the workpiece, so that the lines of force are concentrated in that area and serve to hold the workpiece against the surface 25 without distortion. This produces very little slippage between the driver and the workpiece 11 which means that not only is the workpiece not subject to being scratched, but also the lip 24 of the inner shell 19 is not subject to wear. Therefore, it does not need to be replaced frequently, as was true with prior art devices.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

I claim

1. A machine tool for generating a surface of revolution on a workpiece, comprising:
    a. a base,
    b. a toolhead mounted on the base,
    c. a workhead mounted on the base, and having a spindle rotating about the axis of the surface of revolution,
    d. a driver mounted on the end of the spindle adjacent the toolhead, the driver consisting of an inner and an outer spaced, concentric frusto-conical shell of magnetic material separated by a body of non-magnetic material, the inner shell, being provided with a lip having a flat radial surface for contacting the workpiece and defining a first plane and the outer shell being provided with a similar flat radial surface which is spaced a small amount away from the first-mentioned first plane and from the workpiece, and
    e. an annular coil mounted adjacent one of the shells to produce lines of force from one shell through the workpiece into the other shell.

2. A machine tool as recited in claim 1, wherein the coil lies adjacent the inner shell, and wherein a body of magnetic material extends from the outer shell around the coil to the side of the coil facing away from the side adjacent the inner shell.

3. A machine tool as recited in claim 1, wherein each shell consists of a body defined generally by an outer frusto-conical surface and an inner frusto-conical surface of substantially less angle than the outer surface.

4. A machine tool as recited in claim 3, wherein the outer surface of the inner shell is a frusto-conical surface of substantially smaller angle than that of the inner surface of the outer shell, whereby the body of non-magnetic material is thin at the small ends of the shells and substantially thicker at the large ends of the shell.

* * * * *